United States Patent Office 2,848,414
Patented Aug. 19, 1958

2,848,414

CORROSION INHIBITOR

Joseph A. Chenicek, Bensenville, Ill., assignor to Universal Oil Products Company, Des Plaines, Ill., a corporation of Delaware No Drawing. Application November 23, 1955
Serial No. 548,761

13 Claims. (Cl. 252—32.5)

This invention relates to corrosion inhibitors and more particularly to inhibitors for use in preventing corrosion of certain metal surfaces by water, associated in relatively small quantities, with organic materials.

In the handling of various organic materials, particularly hydrocarbons and similar organic liquid compositions, it is often necessary to transport and/or store such materials in metal containers, as in steel or other metal pipe lines, drums, tanks and the like. Since these materials often contain varying amounts of water in solution or in suspension which may separate, due to temperature changes, internal corrosion of the container by separating water almost invariably occurs to a greater or lesser degree. This problem is especially serious when gasoline, jet fuel, kerosene, fuel oil, crude oil, etc., are under consideration. In spite of all reasonable and practical precautions during the manufacture of the hydrocarbon distillates, when the same are transported in pipe lines or stored in drums or tanks for a period of time, an appreciable quantity of water separation is found as a film or in minute droplets in the pipe line or in container walls or even in small pools in the bottom of the container. This brings about ideal conditions for corrosion and consequent damage to the metal surfaces of the container as well as the even more serious contamination of the hydrocarbon oil or other materials contained therein by the corrosion products.

Corrosion problems also occur, for example in the lubrication of internal combustion engines or steam engines including reciprocating engines, turbines and other similar machinery, in which quantities of water are often observed as separate phases within the lubricating system as a result of the condensation of water from the atmosphere or, in the case of interanl combustion engines, as a result of dispersion or absorption in lubricating oil of water formed as a product of fuel combustion. Water, in such instances, corrodes the various metal parts of the machinery with which it comes in contact, the corrosion products causing further mechanical damages to bearing surfaces and the like due to their abrasive nature and catalytically promoting the chemical degradation of the lubricant. Corrosion problems are encountered with other oils including cutting oils, soluble oils, slushing oils, rolling oils, the latter comprising oils used in the rolling of metals, which oils also may be used in other forming operations such as stamping, cutting, casting, etc., of metals, etc. These oils may be of mineral, animal or vegetable origin. Corrosion problems also arise in the preparation, transportaion and use of alcohols, ketones, etc., and in various coating compositions such as greases, household oils, paints, lacquers, etc., which often are applied to metal surfaces for protective purposes.

Another example of a serious corrosion problem is in the distillation of hydrocarbon or other distillates containing acidic components. Water invariably is present during the distillation and this results in corrosion of the distillation zone as well as of the communicating piping, heat exchangers, coolers, receivers, or the like. During such distillation, it is extremely desirable to employ a corrosion inhibitor which will be soluble in the overhead distillate so that the inhibitor will be retained therein and will serve to prevent corrosion of the communicating piping, heat exchangers, coolers, receivers, etc., and also will be retained in the overhead distillate to prevent corrosion of metallic equipment through or into which the distillate is subsequently passed. The novel inhibitor of the present invention is soluble in lighter constituents and, therefore, will be retained in the overhead distillate and will travel through and protect the subsequent plant equipment, as well as being retained in the distillate until final use and thus protecting the storage tanks and engine parts.

In one embodiment, the present invention relates to a non-corrosive composition of matter comprising an organic material coming in contact with water during the useful life thereof, said organic material containing dissolved therein in a minor proportion, but in an amount sufficient to inhibit corrosion of metal surfaces by water, an alkyl acid phosphate salt of an N-alkyl diaminoalkane, at least one of the alkyl groups constituting the ester portion of said acid phosphate containing at least 6 and preferably at least 8 carbon atoms.

In a specific embodiment, the present invention relates to a non-corrosive composition of matter comprising a hydrocarbon coming in contact with water during the useful life thereof, said hydrocarbon having dissolved therein, in a small but sufficient amount to prevent corrosion of metal surfaces by said water, of an inhibitor comprising a mixture of mono- and dioctyl acid orthophosphate salts of N-tallow-1,3-diaminopropane.

In accordance with the present invention, corrosion is inhibited by incorporating the novel additive of the present invention in the organic material containing or contacting water. The additive comprises an alkyl acid phosphate salt of an N-alkyl diaminoalkane. The term "alkyl acid phosphate" includes both the alkyl acid orthophosphates and the alkyl acid pyrophosphates. In the alkyl acid orthophosphates, the mono-alkyl ester, dialkyl ester or a mixture thereof may be employed. In the alkyl acid pyrophosphates, the monoalkyl ester, dialkyl ester, trialkyl ester or mixtures thereof may be employed, the dialkyl ester being preferred and the ester groups may be attached to the same or different phosphorus atom. Generally, however, this compound will be symmetrical and, thus, the alkyl ester groups will be attached to different phosphorus atoms.

As hereinbefore set forth, it is essential that at least one of the alkyl groups constituting the ester comprises at least 6 and preferably at least 8 carbon atoms. As will be shown by the following examples, salts in which at least one of these ester groups contains at least 6 carbon atoms are considerably more effective than salts in which these ester groups contain less than 6 carbon atoms each.

Any suitable N-alkyl diaminoalkane may be utilized in forming the salt of the alkyl acid orthophosphate or alkyl acid pyrophosphate. The preferred diaminoalkanes may be illustrated by the following general formula:

R—NH—R$^1$—NH$_2$ where R is an alkyl group, preferably of at least 6 carbon atoms and still more preferably of at least 10 carbon atoms, and R$^1$ is a hydrocarbon diradical, preferably containing 3 carbon atoms, although it may contain 2 or 4 or more carbon atoms.

A particularly preferred N-alkyl diaminoalkane is N-alkyl-1,3-diaminopropane, the alkyl group being derived from tallow. This compound is available commercially under the trade name of "Duomeen-T." Other preferred N-alkyl-1,3-diaminopropanes comprise those in which the alkyl group is derived from lauric acid, coconut fatty acids, soya fatty acids, etc. These are available commercially at the present time and comprise mixed alkyl-substituted 1,3-diaminopropanes. For example, in the case of "Duomeen-T," the alkyl group contains from about 12 to 20 carbon atoms per group and mostly contain 16 to 18 carbon atoms. However, when desired, the alkyl group of the N-alkyl-1,3-diaminopropanes or other N-alkyl diaminoalkanes may be prepared to contain any number of carbon atoms desired in the alkyl group and, thus, is selected from hexyl, heptyl, octyl, nonyl, decyl, undecyl, dodecyl, tridecyl, tetradecyl, pentadecyl, hexadecyl, heptadecyl, octadecyl, nonadecyl, iecosyl, etc. It is understood that a mixture of amines containing different alkyl groups may be employed.

While the N-alkyl-1,3-diaminopropanes are preferred it is understood that other suitable N-alkyl diaminoalkanes may be employed. Illustrative examples include N-alkyl-1,2-diaminoethanes, N-alkyl-1,2-diaminopropanes, N-alkyl-1,2-diaminobutanes, N-alkyl-1,3-diaminobutanes, N-alkyl-1,4-diaminobutanes, N-alkyl-1,2-diaminopentanes, N-alkyl-1,3-diaminopentanes, N-alkyl-1,4-diaminopentanes, N-alkyl-1,5-diaminopentanes, N-alkyl-1,2-diaminohexanes, N-alkyl-1,3-diaminohexanes, N-alkyl-1,4-diaminohexanes, N-alkyl-1,5-diaminohexanes, N-alkyl-1,6-diaminohexanes, etc. It is understood that these various N-alkyl diaminoalkanes are not necessarily equivalent in the same or different substrates.

Illustrative examples of preferred alkyl acid orthophosphate and pyrophosphate salts of N-alkyl diaminoalkanes are set forth below. However, it is understood that these are presented merely as preferred examples and that other suitable alkyl acid phosphate salts of N-alkyl diaminoalkanes may be employed. Referring to the alkyl acid orthophosphate salts, the preferred salts include monooctyl acid orthophosphate salt of N-tallow-1,3-diaminopropane, dioctyl acid orthophosphate salt of N-tallow-1,3-diaminopropane, mixture of mono- and dioctyl acid orthophosphate salts of N-tallow-1,3-diaminopropane, monononyl acid orthophosphate salt of N-tallow-1,3-diaminopropane, dinonyl acid orthophosphate salt of N-tallow-1,3-diaminopropane, mixture of mono- and dinonyl acid orthophosphate salts of N-tallow-1,3-diaminopropane, monodecyl acid orthophosphate salt of N-tallow-1,3-diaminopropane, didecyl acid orthophosphate salt of N-tallow-1,3-diaminopropane, mixture of mono- and didecyl acid orthophosphate salts of N-tallow-1,3-diaminopropane, monoundecyl acid orthophosphate salt of N-tallow-1,3-diaminopropane, diundecyl acid orthophosphate salt of N-tallow-1,3-diaminopropane, mixture of mono- and diundecyl acid orthophosphate salts of N-tallow-1,3-diaminopropane, monododecyl acid orthophosphate salt of N-tallow-1,3-diaminopropane, didodecyl acid orthophosphate salt of N-tallow-1,3-diaminopropane, mixture of mono- and didodecyl acid orthophosphate salts of N-tallow-1,3-diaminopropane, etc., monooctyl acid orthophosphate salt of N-lauryl-1,3-diaminopropane, dioctyl acid orthophosphate salt of N-lauryl-1,3-diaminopropane, mixture of mono- and dioctyl acid orthophosphate salts of N-lauryl-1,3-diaminopropane, monononyl acid orthophosphate salt of N-lauryl-1,3-diaminopropane, dinonyl acid orthophosphate salt of n-lauryl-1,3-diaminopropane, mixture of mono- and dinonyl acid orthophosphate salts of N-lauryl-1,3-diaminopropane, monodecyl acid orthophosphate salt of N-lauryl-1,3-diaminopropane, didecyl acid orthophosphate salt of N-lauryl-1,3-diaminopropane, mixture of mono- and didecyl acid orthophosphate salts of N-lauryl-1,3-diaminopropane, etc.

Preferred alkyl acid pyrophosphate salts of N-alkyl diaminoalkanes include monooctyl acid pyrophosphate salt of N-tallow-1,3-diaminopropane, dioctyl acid pyrophosphate salt of N-tallow-1,3-diaminopropane, mixture of mono- and dioctyl acid pyrophosphate salts of N-tallow-1,3-diaminopropane, monononyl acid pyrophosphate salt of N-tallow-1,3-diaminopropane, dinonyl acid pyrophosphate salt of N-tallow-1,3-diaminopropane, mixture of mono- and dinonyl acid pyrophosphate salts of N-tallow-1,3-diaminopropane, monodecyl acid pyrophosphate salts of N-tallow-1,3-diaminopropane, didecyl acid pyrophosphate salt of N-tallow-1,3-diaminopropane, mixture of mono- and didecyl acid pyrophosphate salts of N-tallow-1,3-diaminopropane, mono-undecyl acid pyrophosphate salt of N-tallow-1,3-diaminopropane, diundecyl acid pyrophosphate salt of N-tallow-1,3-diaminopropane, mixture of mono- and diundecyl acid pyrophosphate salts of N-tallow-1,3-diaminopropane, monododecyl acid pyrophosphate salt of N-tallow-1,3-diaminopropane, didodecyl acid pyrophosphate salt of N-tallow-1,3-diaminopropane, mixture of mono- and didodecyl acid pyrophosphate salts of N-tallow-1,3-diaminopropane, etc., monooctyl acid pyrophosphate salt of N-lauryl-1,3-diaminopropane, dioctyl acid pyrophosphate salt of N-lauryl-1,3-diaminopropane, mixture of mono- and dioctyl acid pyrophosphate salts of N-lauryl-1,3-diaminopropane, monononyl acid pyrophosphate salt of N-lauryl-1,3-diaminopropane, dinonyl acid pyrophosphate salt of N-lauryl-1,3-diaminopropane, mixture of mono- and dinonyl acid pyrophosphate salts of N-lauryl-1,3-diaminopropane, etc. As hereinbefore set forth, these are presented as preferred examples, with the understanding that other suitable salts may be employed. For example, alkyl acid phosphates, including both the ortho- and pyrophosphates, are manufactured commercially as a mixture of mono- and dialkyl acid phosphates and are available commercially at a considerably lower cost. In many cases, such mixtures are very suitable for use in preparing the salt of the present invention and such use, therefore, is preferred for economic reasons.

In general, the neutral salt of the alkyl acid phosphate and N-alkyl diaminoalkane is preferred. The neutral salt is prepared by utilizing stoichiometric amounts of the acid and the amine. In other words, the concentration of alkyl acid phosphate and N-alkyl diaminoalkane will be selected so that there will be an equivalent number of acid groups to amino groups. Thus, the specific concentrations will depend upon whether the orthophosphate or pyrophosphate salt is employed. In another embodiment, the salt is a basic salt, which is prepared by utilizing a deficiency of acid groups in relation to the amino groups, as for example, by utilizing one equivalent of acid per two equivalents of amine. In still another embodiment, an acid salt is employed, which is prepared by using an excess of acid with relation to the amine as, for example, two equivalents of acid per one equivalent of amine. It is understood that these different salts are not necessarily equivalent.

The salt may be prepared in any suitable manner and, in general, is prepared by admixing the alkyl acid phosphate and the N-alkyl diaminoalkane at ambient temperature, preferably with vigorous stirring. The salt is readily prepared at room temperature, although slightly elevated temperatures which generally will not exceed 200° F. may be employed when desired. Excessive temperatures must be avoided because this may result in the undesired formation of phosphor amidic acid derivatives or other reaction products. In other words, it is essential that the temperature be below that at which water is liberated during formation of the salt. Depending upon the particular N-alkyl diaminoalkane and the alkyl acid phosphate salt employed, it may be desirable to utilize a solvent, either in forming a more fluid mixture of the acid and/or amine before mixing or during the mixing thereof. In some cases, it may be desirable to admix the salt with a solvent in order to form a more fluid final product. Any suitable solvent may be used which generally comprises an organic compound and particularly a hydrocarbon distillate.

The amount of additive to be employed will depend upon the particular salt and the organic material in which it is to be used. In general, the additive will be used in a concentration of less than about 5% by weight and thus may range from about 0.0001% to about 5% by weight and still more preferably within the range of from about 0.0001% to about 1% by weight of the organic material. It is understood that this additive may be used along with the other additives used for specific purposes in the organic material and, when desired, the additive of the present invention may be admixed with the other additive or additives and marketed as a single commodity of multiple purposes.

The additives of the present invention are especially effective in preventing water corrosion of various metals and particularly aluminum, nickel, chromium and alloys of these metals. They also are beneficial in preventing water corrosion of copper and copper alloys.

As hereinbefore set forth, the additives of the present invention may be utilized in any organic material containing or contacting water and causing corrosion of metals. The hydrocarbon materials may be paraffinic, olefinic, naphthenic, aromatic, or mixtures thereof. The other organic materials may comprise chlorinated hydrocarbons, alcohols, esters, ethers, ketones, dioxane, amino compounds, amides, fats and fatty oils (edible and non-edible), paints, varnishes, natural waxes, etc.

The following examples are introduced to illustrate further the novelty and utility of the present invention, but not with the intention of unduly limiting the same.

EXAMPLE I

The N-alkyldiaminoalkane used in this example is "Duomeen-T." As hereinbefore set forth, "Duomeen-T" is N-tallow-1,3-diaminopropane and is available commercially. It has a theoretical molecular weight of 320 and a combining molecular weight (based on 80% effective ingredient) of about 400. It is a soft paste and has a melting range of from 111° to 118° F.

As hereinbefore set forth, it is essential that at least one of the ester groups of the alkyl acid phosphate contains at least 6 carbon atoms. In order to demonstrate this, a number of different alkyl acid phosphates were used. These are set forth in the following table which also shows the results of the various salts when used as corrosion inhibitors. In all cases, the neutral salts were prepared and were used in a concentration of 0.01% by weight of the Nujol.

These salts were tested by the ASTM steam turbine oil corrosion test (ASTM D665-52T), which test has been found to correlate with the results obtained in the storage of oil in storage tanks. In this test, a highly polished mild carbon steel rod is placed in 300 cc. of Nujol, to which 30 cc. of synthetic sea water is added, and then heated to and maintained at 140° F. with stirring for 48 hours in a beaker open to the atmosphere. The steel rod then is inspected and the corrosion reported as light, medium or heavy. In addition, the portion of the rod covered with rust is also reported as a number of 1/10 of the rod covered with rust, as well as also reporting the extent of pitting.

Table I

| Sample No. | Orthophosphate used in preparing salt with "Duomeen-T" | Corrosion | Coverage, 1/10ths | Pitting |
|---|---|---|---|---|
| 1 | n-butylisoamyl | heavy | 10 | deep. |
| 2 | di-isoamyl | do | 9 | Do. |
| 3 | isoamyl octyl | light | <1 | none. |

From the data in the above table, it will be noted that the use of samples 1 and 2 resulted in heavy corrosion, whereas the use of sample 3 resulted in light corrosion. Thus, it is imperative that at least one of the ester groups of the acid phosphate contains an alkyl group of at least 6 carbon atoms. Furthermore, sample 3 was found to be completely soluble in propane-propylene mixtures and, therefore, is of especial advantage for use as a corrosion inhibitor where solubility in liquefied petroleum gas is important. Also, the fact that this salt is soluble in light hydrocarbons means that the salt will be carried over in the overhead product from the distillation zone and will serve to inhibit corrosion of the communicating equipment, as well as of the subsequent storage equipment.

EXAMPLE II

A similar set of runs as described in Example I was made when using the alkyl acid pyrophosphate-Duomeen-T salt. The results of these tests are reported in Table II.

Table II

| Sample No. | Pyrophosphate used in preparing salt with "Duomeen-T" | Corrosion | Coverage, 1/10ths | Pitting |
|---|---|---|---|---|
| 4 | isoamyl | heavy | 10 | deep. |
| 5 | mixture of mono- and dioctyl | light | 1 | none. |

Here again, it will be noted that the use of the alkyl acid phosphate salt containing 8 carbon atoms in the alkyl group was very effective, whereas the salt containing 5 carbon atoms in the ester group was ineffective.

EXAMPLE III

In Examples I and II the neutral salts were used. In this example, the acid pyrophosphate salts were used, utilizing an equivalent ratio of 2:1 acid to amine. These results are reported in Table III.

Table III

| Sample No. | Pyrophosphate used in preparing salt with "Duomeen-T" | Corrosion | Coverage, 1/10ths | Pitting |
|---|---|---|---|---|
| 6 | isoamyl | heavy | 10 | deep. |
| 7 | mixture of mono- and dioctyl | light | 2 | none. |

EXAMPLE IV

A number of additional alkyl acid phosphate salts of "Duomeen-T" have been prepared and tested in the ASTM steam turbine oil corrosion test. The results of these tests are reported in the following table. Here again, the neutral salts were prepared and these were used in a concentration of 0.01% by weight of the Nujol.

Table IV

| Sample No. | Salt | Corrosion | Coverage, 1/10ths | Pitting |
|---|---|---|---|---|
| 8 | isoamyl 2-ethylhexyl acid orthophosphate salt of "Duomeen-T." | moderate | 1 | shallow. |
| 9 | mixture of mono- and di-isooctyl acid orthophosphate salt of "Duomeen-T." | clean | 0 | none. |
| 10 | ethyl lauryl acid orthophosphate salt of "Duomeen-T." | moderate | <1 | shallow. |
| 11 | diisooctyl acid pyrophosphate salt of "Duomeen-T." | do | <1 | Do. |
| 12 | mixture of mono- and di-2-ethylhexyl acid orthophosphate salt of "Duomeen-T." | light | 1 | Do. |
| 13 | di-n-butyl acid pyrophosphate salt of "Duomeen-T." | severe | 9.5 | deep. |

From the data in the above example, it is noted that salts meeting the requirements hereinbefore set forth were effective in retarding corrosion. On the other hand, sample 13 (not containing at least one alkyl ester group of at least six carbon atoms) was ineffective in retarding corrosion.

EXAMPLE V

The acid salts of two of the neutral salts reported in Example IV also were prepared and tested. Here again, the salts each were used in a concentration of 0.01% by weight of the Nujol.

Table V

| Sample No. | Salt | Corrosion | Coverage, 1/10ths | Pitting |
|---|---|---|---|---|
| 14 | di-n-butyl acid pyrophosphate acid salt of "Duomeen-T." | severe | 8 | deep. |
| 15 | di-isooctyl acid pyrophosphate acid salt of "Duomeen-T." | moderate | 2 | shallow. |

Here again, it will be noted that the salt of the pyrophosphate containing 8 carbon atoms was effective as a corrosion inhibitor and that the salt prepared from dibutyl acid pyrophosphate was ineffective.

I claim as my invention:

1. A non-corrosive composition of matter consisting essentially of a hydrocarbon material coming in contact with water during the useful life thereof, said hydrocarbon material having dissolved therein a corrosion inhibiting amount of an alkyl acid phosphate salt of an N-alkyl diaminoalkane of the general formula $$R\text{—}NH\text{—}R'\text{—}NH_2$$

wherein R is an alkyl group of at least 6 carbon atoms and R' is a hydrocarbon radical of from 2 to 4 carbon atoms, at least one of the alkyl groups constituting the ester portion of said alkyl acid phosphate containing at least 8 carbon atoms.

2. A non-corrosive composition of matter consisting essentially of a hydrocarbon material coming in contact with water during the useful life thereof, said hydrocarbon material having dissolved therein a corrosion inhibiting amount of an alkyl acid orthophosphate salt of an N-alkyl diaminoalkane of the general formula R—NH—R'—NH$_2$ wherein R is an alkyl group of at least 6 carbon atoms and R' is a hydrocarbon radical of from 2 to 4 carbon atoms, at least one of the alkyl groups constituting the ester portion of said alkyl acid orthophosphate containing at least 8 carbon atoms.

3. A non-corrosive composition of matter consisting essentially of a hydrocarbon material coming in contact with water during the useful life thereof, said hydrocarbon material having dissolved therein a corrosion inhibiting amount of an alkyl acid pyrophosphate salt of an N-alkyl diaminoalkane of the general formula R—NH—R'—NH$_2$ wherein R is an alkyl group of at least 6 carbon atoms and R' is a hydrocarbon radical of from 2 to 4 carbon atoms, at least one of the alkyl groups constituting the ester portion of said alkyl acid pyrophosphate containing at least 8 carbon atoms.

4. A non-corrosive composition of matter consisting essentially of a hydrocarbon material coming in contact with water during the useful life thereof, said hydrocarbon material having dissolved therein a corrosion inhibiting amount of an octyl acid phosphate salt of an N-alkyl diaminoalkane of the general formula $$R\text{—}NH\text{—}R'\text{—}NH_2$$

wherein R is an alkyl group of at least 6 carbon atoms and R' is a hydrocarbon radical of from 2 to 4 carbon atoms.

5. A non-corrosive composition of matter consisting essentially of a hydrocarbon material coming in contact with water during the useful life thereof, said hydrocarbon material having dissolved therein a corrosion inhibiting amount of an alkyl acid phosphate salt of an N-alkyl diaminoalkane of the general formula $$R\text{—}NH\text{—}R'\text{—}NH_2$$

wherein R is an alkyl group of at least 10 carbon atoms and R' is a hydrocarbon radical of 3 carbon atoms, at least one of the alkyl groups constituting the ester portion of said alkyl acid phosphate containing at least 6 carbon atoms, and the alkyl group attached to the nitrogen atom in said diaminoalkane containing at least 8 carbon atoms.

6. The composition of claim 5 further characterized in that R is an alkyl group derived from tallow.

7. The composition of claim 5 further characterized in that R is an alkyl group containing from about 12 to about 20 carbon atoms.

8. A non-corrosive composition of matter consisting essentially of a hydrocarbon oil coming in contact with water during the useful life thereof, said hydrocarbon oil having dissolved therein a corrosion inhibiting amount of a mixture of mono- and dioctyl acid phosphate neutral salts of N-alkyl-1,3-diaminopropane, the last mentioned alkyl containing from about 12 to about 20 carbon atoms.

9. A non-corrosive composition of matter consisting essentially of a hydrocarbon oil coming in contact with water during the useful life thereof, said hydrocarbon oil having dissolved therein a corrosion inhibiting amount of a mixture of mono- and dioctyl acid orthophosphate neutral salts of N-tallow-1,3-diaminopropane.

10. A non-corrosive composition of matter consisting essentially of a hydrocarbon oil coming in contact with water during the useful life thereof, said hydrocarbon oil having dissolved therein a corrosion inhibiting amount of a mixture of mono- and dioctyl acid pyrophosphate neutral salts of N-tallow-1,3-diaminopropane.

11. Gasoline having dissolved therein from about 0.0001% to about 1% by weight of an alkyl acid phosphate salt of an N-alkyl diaminoalkane of the generic formula R—NH—R'—NH$_2$ wherein R is an alkyl group of at least 6 carbon atoms and R' is a hydrocarbon radical of from 2 to 4 carbon atoms, at least one of the alkyl group constituting the ester portion of said alkyl acid phosphate containing at least 8 carbon atoms.

12. Gasoline having dissolved therein from about 0.0001% to about 1% by weight of a mixture of mono- and dioctyl acid phosphate salts of N-alkyl-1,3-diaminopropane, the last-mentioned alkyl group containing from about 12 to about 20 carbon atoms.

13. Gasoline having dissolved therein about 0.0001% to about 1% by weight of a mixture of mono- and dioctyl acid orthophosphate salts of N-tallow-1,3-diaminopropane.

References Cited in the file of this patent
UNITED STATES PATENTS

| | | |
|---|---|---|
| 2,371,851 | Smith et al. | Mar. 20, 1945 |
| 2,664,400 | Woodstock et al. | Dec. 29, 1953 |
| 2,736,658 | Pfohl et al. | Feb. 28, 1956 |